Patented July 30, 1929.

1,722,553

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

CAOUTCHOUC COMPOSITION.

No Drawing.   Application filed June 16, 1924.   Serial No. 720,290.

The invention relates to a composition of matter or a compound having as an ingredient the latex of rubber, gutta-percha, balata or other like materials.

A principal object of the invention is to combine or incorporate a carbo-hydrate or starch, such as tapioca meal or tapioca or a composition containing a cassava carbo-hydrate or tapioca meal as an essential element, with a gummy substance such as gutta-percha, balata and the like or compositions thereof and in the form or state in which they exist as crude or refined latex.

Another object of the invention is to make a compound or composition of matter of the nature above mentioned which shall be adapted for use in the various arts, as, for example, in the manufacture of insulating materials, resilient materials, adhesives, water resisting glues, sizings, binders, paints and coatings.

By the use of the term "latex" herein is meant any of the milky or laticiferous saps or juices obtained from plants more particularly those yielding caoutchouc.

By the term "caoutchouc" as used in this disclosure is meant rubber, gutta-percha, balata, rubber substitutes and similar substances having like properties in the form or state in which they exist as crude or refined latex, as well as compositions or mixtures thereof. Inasmuch as these various substances have essentially substantially identical physical and chemical properties and are generally regarded as equivalent, differing only in the proportions of resinous and proteinous matter contained therein, they may be spoken of generically by the term "caoutchouc". Under the specific mention of rubber, gutta-percha, and balata is to be understood that the same are wholly or partly in the latex form or state.

The term "cassava carbo-hydrate" is intended to comprehend any and all products of the cassava herb or plant in the nature of a carbo-hydrate, such as tapioca or tapioca meal or flour. Such carbo-hydrate may be used in the pure soluble or insoluble state or in the plastic, semi-plastic, dry or powdered form as may be more convenient for the purposes desired.

In my prior United States Patent No. 1,437,487, granted December 5, 1922, I have disclosed a new and useful composition of matter comprising caoutchouc latex and casein.

Inasmuch as no two articles produced in accordance with this invention would have the ingredients thereof in exactly the same proportions, my invention is not restricted to any particular proportions nor is it restricted to any particular process of making the composition or compound. However, for example only, I shall set forth a formula which I have found satisfactory in practice for making a sizing or coating material for paper:

Tapioca meal_____ 100 parts
Rubber latex_____ 15 to 300 parts

To make a glue which I have found satisfactory in practice, I may add an earthy alkali, for example, lime ¼ to 5 parts, to the composition of matter formed under the foregoing formula, the alkali assisting to break up the starch. Preferably the tapioca meal is first dissolved in water which subsequently evaporates. Although the water in some form or other is needed to make the herein disclosed composition complete in its chemical action its addition to the mixture may take place at various times. The dry tapioca starch and the lime, with or without other substances may be put up in dry form for convenience in shipping; the latex and/or water to be subsequently added. Or the water may be mixed with the different ingredients separately or collectively at the place where they are first compounded and/or used.

By using a cassava carbo-hydrate such as, for example, tapioca meal or tapioca, in compositions of rubber, gutta-percha, balata and the like, a desired flexibility of the resultant compound is obtained together with waterproofing and binding qualities which make the composition of matter very suitable for such purposes as the coating or sizing of paper and textiles and the gluing of wood products.

While I have herein described the mode of combining certain ingredients to make the compound in accordance with my invention, it is to be understood, however, that the invention is not limited to the particular ingredients or the mode of treatment herein described but other ingredients having substantially the same or similar characteristics may be employed in substantially the same manner without departing from the spirit of the invention and the scope of the appended claims.

Having thus described my invention, I claim and desire to protect by Letters Patent of the United States:

1. An adhesive or adhesive-like composition comprising caoutchouc latex, tapioca meal and lime.

2. An adhesive or adhesive-like composition comprising caoutchouc latex, tapioca meal, lime and water.

In witness whereof, I have hereunto set my hand this 14th day of June, 1924.

ARTHUR BIDDLE.